US012725848B2

(12) United States Patent
Deng et al.

(10) Patent No.: US 12,725,848 B2
(45) Date of Patent: Sep. 1, 2026

(54) BATTERY HOUSING, LITHIUM-ION SECONDARY BATTERY, AND ELECTRIC VEHICLE

(71) Applicants: Microvast Power Systems Co., Ltd., Huzhou (CN); Microvast, Inc., Stafford, TX (US)

(72) Inventors: Guoyou Deng, Huzhou (CN); Yong Jin, Huzhou (CN); Xiaojie Shen, Huzhou (CN); Qingfeng Zang, Huzhou (CN); Junli Zhang, Huzhou (CN)

(73) Assignees: MICROVAST POWER SYSTEMS CO., LTD., Huzhou (CN); MICROVAST, INC., Stafford, TX (US)

( * ) Notice: Subject to any disclaimer, the term of this patent is extended or adjusted under 35 U.S.C. 154(b) by 559 days.

(21) Appl. No.: 18/266,278

(22) PCT Filed: Dec. 10, 2020

(86) PCT No.: PCT/CN2020/135056
§ 371 (c)(1),
(2) Date: Jun. 9, 2023

(87) PCT Pub. No.: WO2022/120667
PCT Pub. Date: Jun. 16, 2022

(65) Prior Publication Data

US 2024/0039071 A1 Feb. 1, 2024

(51) Int. Cl.
*H01M 10/613* (2014.01)
*H01M 10/0525* (2010.01)
(Continued)

(52) U.S. Cl.
CPC ..... *H01M 10/613* (2015.04); *H01M 10/0525* (2013.01); *H01M 10/6556* (2015.04);
(Continued)

(58) Field of Classification Search
None
See application file for complete search history.

(56) References Cited

U.S. PATENT DOCUMENTS

2011/0300414 A1 12/2011 Baek
2015/0111068 A1 4/2015 Seong
(Continued)

FOREIGN PATENT DOCUMENTS

CN 105514318 A 4/2016
CN 205583050 U 9/2016
(Continued)

OTHER PUBLICATIONS

Machine translation of CN 207743363U, published on Aug. 17, 2018 (Year: 2018).*
(Continued)

*Primary Examiner* — Anca Eoff
(74) *Attorney, Agent, or Firm* — Andrew C. Cheng

(57) ABSTRACT

Provided is a battery housing. The battery housing has an opening at both ends in a length direction, respectively, and the battery housing is provided with at least one cooling unit extending along the length direction. The cooling unit is provided with a coolant channel for coolant circulation, and the at least one cooling unit divides the internal space of the battery housing into at least two accommodating cavities spaced apart from top to bottom in a height direction. Each accommodating cavity is used for accommodating a battery cell. By providing the cooling unit in the battery housing, the heat generated by the battery cell can be dispelled immediately, thereby quickly and effectively solving the heat dissipation problem of the battery cell during charging and discharging. Also provided are a lithium-ion secondary battery and an electric vehicle.

15 Claims, 9 Drawing Sheets

(51) Int. Cl.

| | |
|---|---|
| ***H01M 10/6556*** | (2014.01) |
| ***H01M 50/103*** | (2021.01) |
| ***H01M 50/143*** | (2021.01) |

(52) U.S. Cl.

CPC ....... *H01M 50/103* (2021.01); *H01M 50/143* (2021.01); *H01M 2220/20* (2013.01)

(56) References Cited

U.S. PATENT DOCUMENTS

| | | | | |
|---|---|---|---|---|
| 2016/0204482 | A1 | 7/2016 | Han | |
| 2017/0229705 | A1* | 8/2017 | Pieczonka | H01M 10/0568 |
| 2018/0048039 | A1 | 2/2018 | Newman | |
| 2018/0102521 | A1 | 4/2018 | Cho | |
| 2020/0006820 | A1 | 1/2020 | Cha | |
| 2020/0035963 | A1 | 1/2020 | Yoshioka | |
| 2023/0042566 | A1* | 2/2023 | Sun | H01M 10/6555 |

FOREIGN PATENT DOCUMENTS

| | | | |
|---|---|---|---|
| CN | 207353315 | U | 5/2018 |
| CN | 108183281 | A | 6/2018 |
| CN | 207743363 | U | 8/2018 |
| CN | 207743364 | U | 8/2018 |
| CN | 208862046 | U | 5/2019 |
| CN | 209374492 | U | 9/2019 |
| CN | 110600654 | U | 12/2019 |
| CN | 110783501 | A | 2/2020 |
| CN | 210272434 | U | 4/2020 |
| CN | 210607415 | U | 5/2020 |
| CN | 210984839 | U | 7/2020 |
| CN | 111602282 | A | 8/2020 |
| CN | 211350864 | U | 8/2020 |
| CN | 211879492 | U | 11/2020 |
| CN | 212113796 | U | 12/2020 |
| JP | 2009004271 | A | 1/2009 |
| JP | 2016009672 | A | 1/2016 |
| WO | 2020192206 | A1 | 10/2020 |

OTHER PUBLICATIONS

The extended European search report of EP patent application No. 20964606.6 issued on Aug. 8, 2024.

* cited by examiner

BATTERY HOUSING, LITHIUM-ION SECONDARY BATTERY, AND ELECTRIC VEHICLE

CROSS REFERENCE TO RELATED APPLICATION

This application is a 35 U.S.C. § 371 National Phase conversion of International (PCT) Patent Application No. PCT/CN2020/135056, filed on Dec. 10, 2020. The PCT International Patent Application was filed and published in Chinese. This application is related to the co-pending application Ser. No. 18/266,277, filed on the same date as this application, entitled "LITHIUM-ION SECONDARY BATTERY AND ELECTRIC VEHICLE", and the co-pending application Ser. No. 18/036,411, filed on May 11, 2023, entitled "BATTERY COVER PLATE AND LITHIUM-ION SECONDARY BATTERY".

BACKGROUND OF THE APPLICATION

Field of the Application

The present application relates to the technical field of battery technology, and in particular, to a battery housing, a lithium-ion secondary battery, and an electric vehicle.

Description of Related Art

With the application and widespread promotion of electric vehicles, batteries, as the core components of electric vehicles, have put forward higher requirements for the safety performance of batteries.

Lithium-ion batteries are widely used due to their high energy density and long service life. The capacity of lithium-ion batteries is directly proportional to the distance traveled by the vehicle, and with the increasing requirements of electric vehicles for range, the capacity of the batteries equipped is also increasing. However, as the battery capacity increases, the heat generated during charging and discharging also increases. If the heat inside the battery is not effectively removed in a timely manner, the performance of the battery will sharply decrease, and there may even be a risk of burning and explosion.

BRIEF SUMMARY OF THE APPLICATION

Technical Problem

The existing technology mainly uses an air cooling system or a liquid cooling system to control the temperature of the battery, and sets up a coolant channel between battery modules or individual batteries. Through the heat exchange between the coolant channel and the battery modules or the individual batteries, the heat of the battery is transmitted to the fluid, and the heat is exported through the fluid, so as to cool the battery. However, in this structure, due to the direct contact and heat exchange between the cooling system and the battery housing, and the heat-generating source of the battery being the battery cells located inside the battery housing, the heat of the battery cells needs to be indirectly exported through the battery housing, so the heat inside the battery cannot be timely exported, resulting in low cooling efficiency of the battery.

Technical Solution

The object of the present application is to provide a battery housing and a lithium-ion secondary battery, aiming to solve the shortcomings of the background technology mentioned above. By setting a cooling unit inside the battery housing, the heat generated by the battery cells can be timely exported, thereby quickly and effectively solving the heat dissipation problem of the battery cells during the charging and discharging process.

An embodiment of the present application provides a battery housing, wherein the battery housing has openings at both ends in the length direction, at least one cooling unit extending along the length direction is provided in the battery housing, a coolant channel for circulation of a coolant is provided in the cooling unit, the at least one cooling unit divides the internal space of the battery housing into at least two accommodating cavities spaced apart from top to bottom in the height direction, each accommodating cavity is configured for accommodating a battery cell.

In an achievable way, the cooling unit is a cooling plate or a cooling tube.

In an achievable way, the battery housing has a prismatic structure and includes two opposite first side plates and two opposite second side plates, the two first side plates and the two second side plates are connected to each other, and the internal space of the battery housing is formed by the enclosure of the two first side plates and the two second side plates.

In an achievable way, each cooling unit includes two opposite first partition plates, the two first partition plates are spaced apart from top to bottom and extend along the length direction, two opposite sides of each first partition plate are respectively connected to the inner walls of the two first side plates, the coolant channel is formed by the enclosure of the two first partition plates and the two first side plates.

In an achievable way, the two opposite sides of each first partition plate are connected to the inner walls of the two first side plates as an integrated structure.

In an achievable way, each cooling unit includes two opposite first partition plates, the two first partition plates are spaced apart from top to bottom and extend along the length direction, and each cooling unit further includes two opposite second partition plates, the two second partition plates are spaced apart from left to right and extend along the length direction, the outer wall of one of the second partition plates is attached to the inner wall of one of the first side plates, and the outer wall of the other second partition plate is attached to the inner wall of the other first side plate, the two first partition plates and the two second partition plates are connected to each other, the coolant channel is formed by the enclosure of the two first partition plates and the two second partition plates.

In an achievable way, the two first side plates are arranged in the height direction, the two second side plates are arranged in the thickness direction of the battery housing, and the two first partition plates are arranged parallel to the two second side plates.

In an achievable way, the number of the cooling unit is one, and the cooling unit is located in the middle of the battery housing, the cooling unit divides the internal space of the battery housing into two accommodating cavities spaced apart from top to bottom in the height direction.

In an achievable way, the number of the cooling unit is two, and the two cooling units are stacked to each other and are located in the middle of the battery housing, the two cooling units divide the internal space of the battery housing into two accommodating cavities spaced apart from top to bottom in the height direction.

In an achievable way, the number of the cooling unit is at least two, and the at least two cooling units are spaced apart from top to bottom in the height direction within the battery housing, the at least two cooling units divide the internal space of the battery housing into at least three accommodating cavities spaced apart from top to bottom in the height direction.

In an achievable way, the number of the cooling unit is at least three, and the at least three cooling units are spaced apart from top to bottom in the height direction within the battery housing, wherein the two cooling units located at the top and bottom are respectively attached to the two second side plates.

In an achievable way, the number of the cooling unit is four, wherein the two cooling units located at the top and bottom are respectively attached to the two second side plates, and the other two cooling units are stacked to each other and are located in the middle of the battery housing.

In an achievable way, there are connectors provided at two opposite ends of each cooling unit, the connectors extend outward from the two ends of the cooling unit, the coolant flows into or out of the coolant channel through the connectors.

Another embodiment of the present application also provides a lithium-ion secondary battery, including the battery housing mentioned above, wherein each accommodating cavity of the battery housing contains a battery cell, and the cooling unit is in thermal conduction contact with the battery cells in adjacent accommodating cavities.

In an achievable way, two opposite ends of each accommodating cavity in the length direction are each sealed with a battery cover plate, and the battery cover plate is arranged at the opening of the battery housing.

In an achievable way, the two battery cover plates provided at two opposite ends of each accommodating cavity in the length direction are each provided with an explosion-proof valve, or only one of the battery cover plates is provided with an explosion-proof valve.

In an achievable way, the two battery cover plates provided at two opposite ends of each accommodating cavity in the length direction are each provided with an electrode terminal, at least one of the battery cover plates is provided with an explosion-proof groove, and the explosion-proof groove surrounds or is set partially around the electrode terminal.

Another embodiment of the present application also provides an electric vehicle, including the lithium-ion secondary battery mentioned above.

For the battery housing provided in the present application, a cooling unit is provided in the battery housing, and a coolant channel is provided in the cooling unit, allowing the coolant to circulate along the coolant channel. Meanwhile, the cooling unit is in thermal conduction contact with the battery cells in adjacent accommodating cavities. Through the heat exchange between the battery cells and the cooling unit, as well as the heat exchange between the cooling unit and the coolant, the heat of the battery cells can be transferred to the coolant, and the heat is exported to the outside of the battery through the coolant, thereby achieving the purpose of cooling the battery. This structure has high heat conduction efficiency and good cooling effect. Also, at least one cooling unit is located between two adjacent battery cells, thus enabling the timely export of heat between the two adjacent battery cells without the problem of heat accumulation between the two adjacent battery cells, thereby effectively solving the internal heat dissipation problem of the battery and improving the safety performance of the battery.

DETAILED DESCRIPTION OF THE APPLICATION

Figure 1:
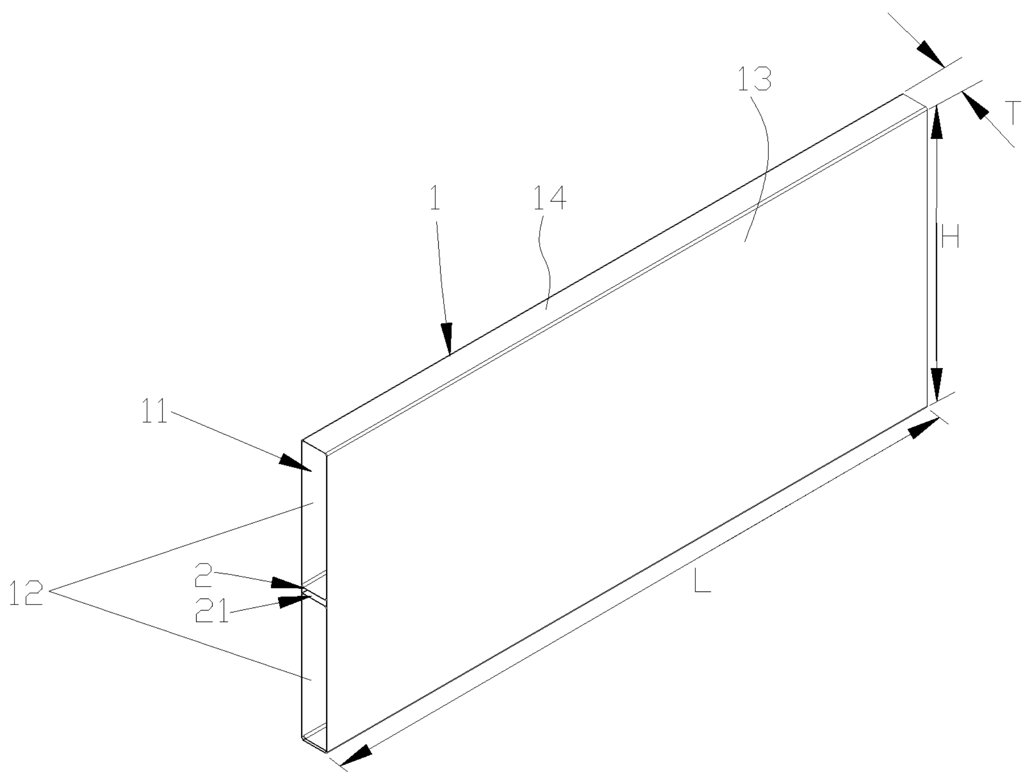
FIG. 1 is a schematic diagram of the three-dimensional structure of the battery housing in an embodiment of the present application.
Figure 2:
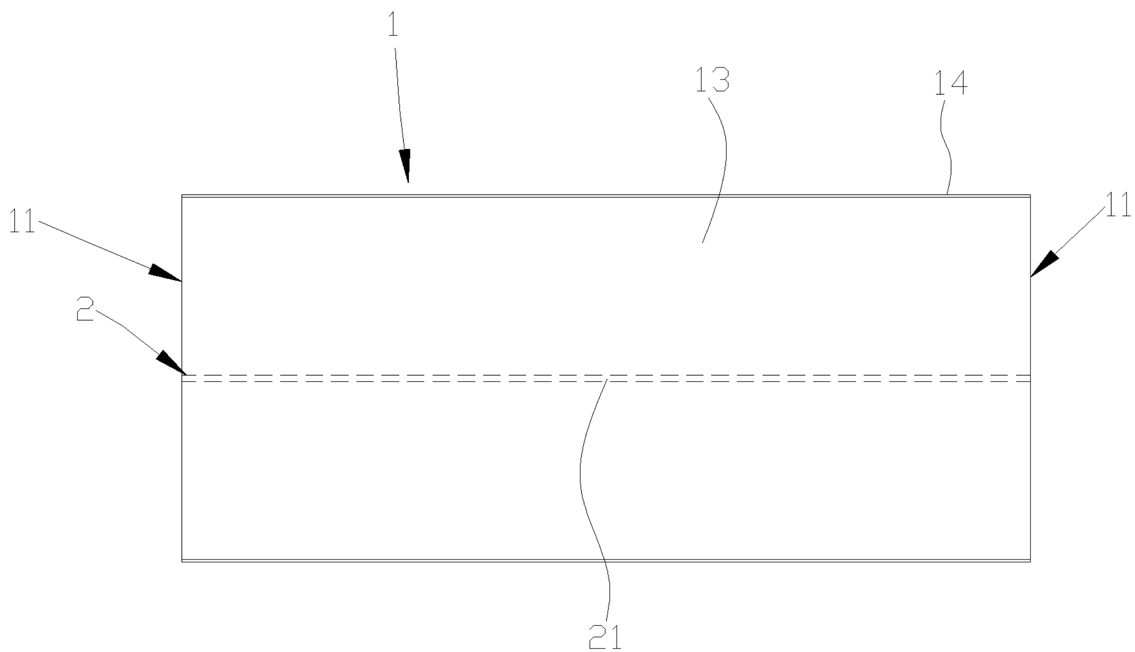
FIG. 2 is the front view of FIG. 1.
Figure 3:
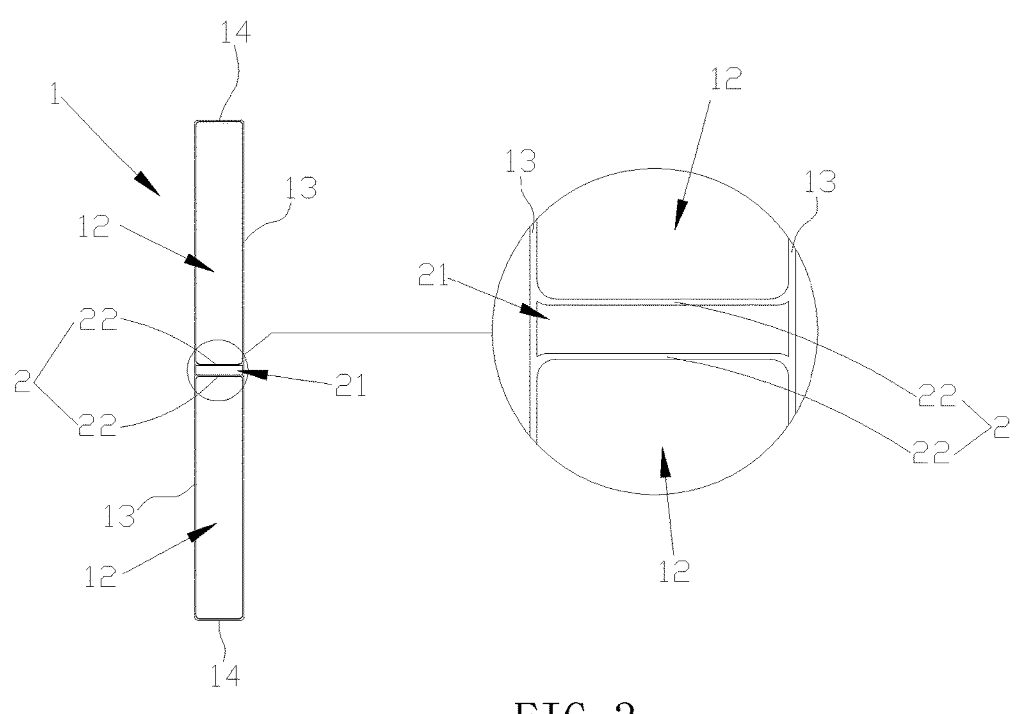
FIG. 3 is the side view of FIG. 1.

The following will provide a further detailed description of the specific implementations of the present application in conjunction with the accompanying drawings and embodiments. The following embodiments are used to illustrate the present application, but are not intended to limit the scope of the present application.

The terms “first”, “second”, “third”, “fourth”, etc. (if any) in the specification and claims of the present application are only used to distinguish similar objects, and are not intended to be used to describe a specific sequence or order.

The terms “up”, “down”, “left”, “right”, “front”, “back”, “top”, “bottom” (if any) mentioned in the specification and claims of the present application are defined based on the position of the structure in the figures and the position between the structures in the figures, only for the clarity and convenience of expressing the technical solution. It should be understood that the use of these directional words should not limit the scope of protection in the present application.

As shown in FIGS. 1 to 3 and FIG. 14, an embodiment of the present application provides a battery housing 1. The battery housing 1 has a prismatic structure, and is particularly suitable for prismatic lithium-ion batteries. The battery housing 1 has a length direction L, a height direction H, and a thickness direction T. The definition of the directions is based on the orientation or positional relationship shown in the drawings, and is only for the convenience of expression and description. Therefore, it cannot be understood as a limitation of the present application. Specifically, the length value of the battery housing 1 in the length direction L is greater than its height value in the height direction H, and the height value of the battery housing 1 in the height direction H is greater than its thickness value in the thickness direction T, that is, the battery housing 1 has a flat structure. Meanwhile, the battery housing 1 is a hollow structure and has openings 11 at both ends in the length direction L.

In the above embodiment, a cooling unit 2 extending along the length direction L is provided in the battery housing 1, and a coolant channel 21 for circulation of a coolant is provided in the cooling unit 2. The cooling unit 2 divides the internal space of the battery housing 1 into two accommodating cavities 12 spaced apart from top to bottom in the height direction H. Each accommodating cavity 12 is used for accommodating a battery cell 4 (the specific structure of the battery cell 4 can be seen in FIG. 14).

In the above embodiment, the cooling unit 2 is located in the middle of the battery housing 1. The cooling unit 2 divides the internal space of the battery housing 1 into two accommodating cavities 12 spaced apart from top to bottom in the height direction H, and each accommodating cavity 12 has the same size as the battery cell 4. Of course, in other embodiments, the sizes of the two accommodating cavities 12 can also be different. For example, one of the accommodating cavities 12 is twice the size of the battery cell 4, and two battery cells 4 can be placed into the accommodating cavity 12, while the other accommodating cavity 12 is the same size as the battery cell 4. The size of the accommodating cavity 12 can be designed according to actual needs.

Specifically, the cross-sectional shape of the coolant channel 21 can be rectangular, circular, or other shapes, and it is not limited herein.

In the above embodiment, the battery housing 1 includes two opposite first side plates 13 and two opposite second side plates 14. The two first side plates 13 and two second side plates 14 are connected to each other, and the internal space of the battery housing 1 is formed by the enclosure of the two first side plates 13 and the two second side plates 14.

In the above embodiment, the cooling unit 2 is a cooling plate structure, and each cooling unit 2 includes two opposite first partition plates 22. The two first partition plates 22 are spaced apart from top to bottom and extend along the length direction L. Two opposite sides of each first partition plate 22 are respectively connected to the inner walls of the two first side plates 13, and the coolant channel 21 is formed by the enclosure of the two first partition plates 22 and the two first side plates 13.

Generally, due to the small thickness of the battery housing 1 and the certain thickness of the cooling unit 2, in order to not occupy more internal space of the battery housing 1 and reduce the size of battery module, the cooling unit 2 is generally not extended along the height direction H of the battery housing 1, that is, the two opposite sides of the first partition plate 22 are not connected to the inner walls of the second side plates 14, but to the inner walls of the first side plates 13, so that the two accommodating cavities 12 are arranged and distributed in the height direction H of the battery housing 1.

Specifically, when cooling the battery, the coolant circulates in the coolant channel 21. Since the accommodating cavity 12 is filled with electrolyte and the coolant cannot be mixed with the electrolyte, the first partition plate 22 needs to be hermetically connected to the first side plate 13 to prevent the coolant from mixing with the electrolyte and affecting battery performance. As an embodiment, the entire battery housing 1 is integrally formed, that is, the two opposite sides of each first partition plate 22 are connected to the inner walls of the two first side plates 13 as an integrated structure.

Generally, the coolant is cooling liquid. The cooling liquid may be water, ethylene glycol aqueous solution, etc.

In the above embodiment, the two first side plates 13 are arranged in the height direction H of the battery housing 1, the two second side plates 14 are arranged in the thickness direction T of the battery housing 1, and the two first partition plates 22 are arranged parallel to the two second side plates 14.

Figure 4:
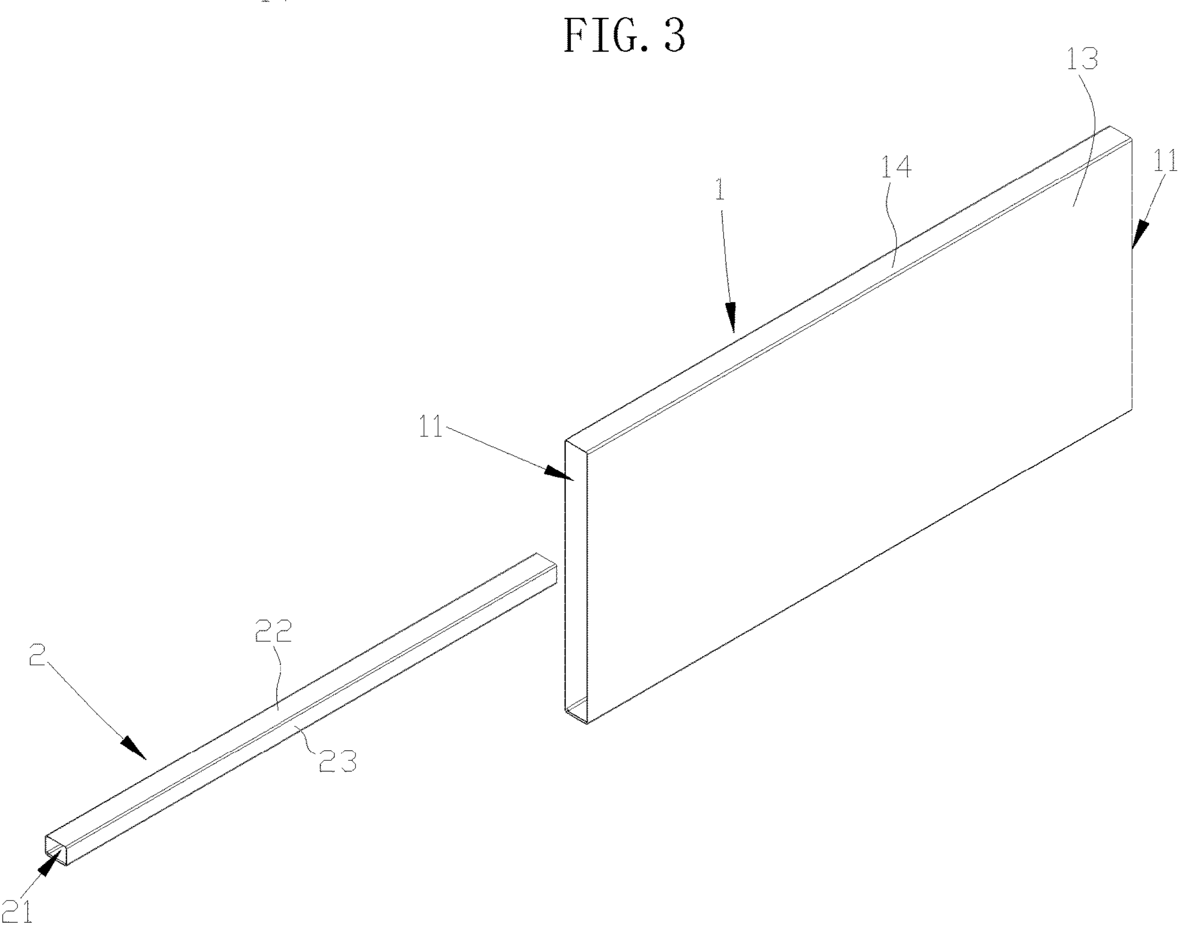
FIG. 4 is an exploded, schematic diagram of the battery housing in another embodiment of the present application.
Figure 5:
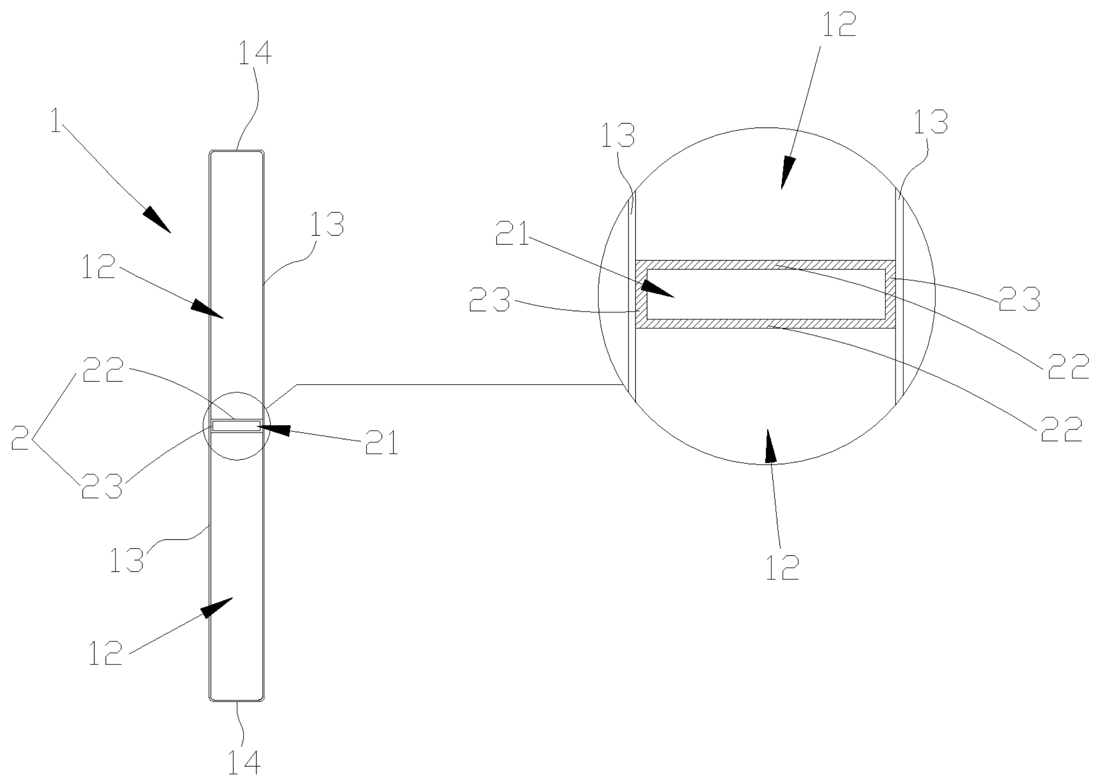
FIG. 5 is the side view of FIG. 4.

As shown in FIGS. 4 and 5, another embodiment of the present application provides a battery housing 1. Unlike the above embodiment, the structure of the cooling unit 2 inside the battery housing 1 is different. Specifically, the cooling unit 2 is a cooling tube structure, and each cooling unit 2 includes two opposite first partition plates 22, and the two first partition plates 22 are spaced apart from top to bottom and extend along the length direction L. Each cooling unit 2 further includes two opposite second partition plates 23, and the two second partition plates 23 are spaced apart from left to right and extend along the length direction L. The outer wall of one of the second partition plates 23 is attached to the inner wall of one of the first side plates 13, and the outer wall of the other second partition plate 23 is attached to the inner wall of the other first side plate 13. The two first partition plates 22 and the two second partition plates 23 are connected to each other, and the coolant channel 21 is formed by the enclosure of the two first partition plates 22 and the two second partition plates 23.

In the above embodiment, the cooling unit 2 is inserted into the battery housing 1 and then fixed in the battery housing 1 by welding or other means.

In other embodiments, the number of the cooling unit 2 installed inside the battery housing 1 can also be multiple, such as two, three, etc. Multiple cooling units 2 are spaced apart from top to bottom in the height direction H within the battery housing 1, and the multiple cooling units 2 divide the internal space of the battery housing 1 into multiple accommodating cavities 12 spaced apart from top to bottom in the height direction H. The multiple accommodating cavities 12 have the same size, and each accommodating cavity 12 is the same size as the battery cell 4. Of course, in other embodiments, the multiple accommodating cavities 12 can have different sizes. For example, one of the accommodating cavities 12 is twice the size of the battery cell 4, and two battery cells 4 can be placed into the accommodating cavity 12. However, the size of other accommodating cavities 12 is the same as that of the battery cell 4. The size of the accommodating cavity 12 can be designed according to actual needs.

Specifically, in order to form at least two accommodating cavities 12 in the battery housing 1, at least one of the cooling units 2 is not attached to the second side plates 14. For example, when the number of the cooling unit 2 is two, if the two cooling units 2 are respectively attached to the two second side plates 14, only one accommodating cavity 12 can be formed in the battery housing 1. When at least two battery cells 4 are placed in the accommodating cavity 12, and if there are no cooling units 2 located between adjacent battery cells 4, the effect of exporting the heat between the battery cells 4 cannot be achieved, that is, the heat inside the battery housing 1 cannot be timely exported.

The following examples illustrate the preferred arrangement and distribution of the cooling units 2 in the battery housing 1 when there are multiple cooling units 2.

Figure 6:
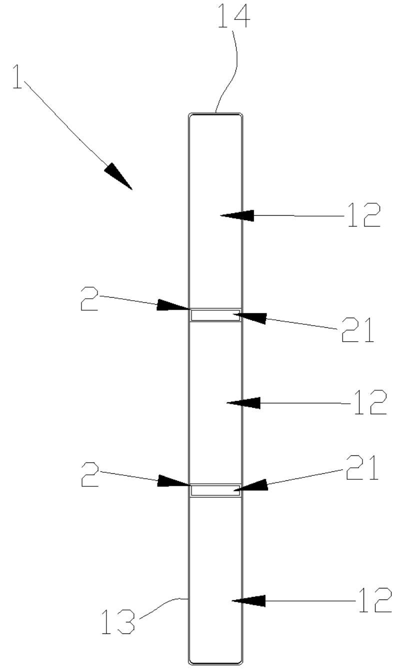
FIG. 6 is a schematic diagram of the structure of the battery housing in another embodiment of the present application.

As shown in FIG. 6, another embodiment of the present application provides a battery housing 1. Unlike the above embodiment, the number of the cooling unit 2 provided in the battery housing 1 is different. Specifically, the number of the cooling unit 2 is two, and the two cooling units 2 are spaced apart from top to bottom in the height direction H within the battery housing 1. The two cooling units 2 divide the internal space of the battery housing 1 into three accommodating cavities 12 spaced apart from top to bottom in the height direction H.

Figure 7:
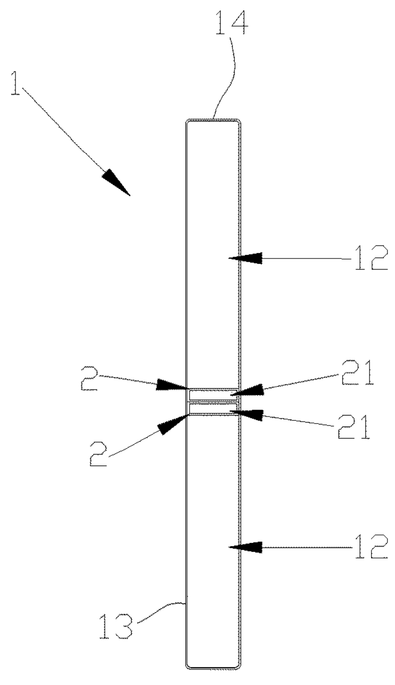
FIG. 7 is a schematic diagram of the structure of the battery housing in another embodiment of the present application.

As shown in FIG. 7, another embodiment of the present application provides a battery housing 1. Unlike the above embodiment, the arrangement of the cooling units 2 is different. Specifically, the number of the cooling unit 2 is two, and the two cooling units 2 are stacked to each other and are located in the middle of the battery housing 1. The two cooling units 2 divide the internal space of the battery housing 1 into two accommodating cavities 12 spaced apart from top to bottom in the height direction H.

Figure 8:
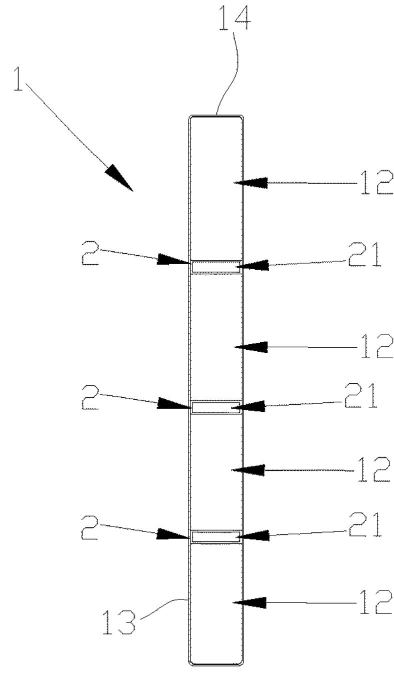
FIG. 8 is a schematic diagram of the structure of the battery housing in another embodiment of the present application.

As shown in FIG. 8, another embodiment of the present application provides a battery housing 1. Unlike the above embodiment, the number of the cooling unit 2 provided in the battery housing 1 is different. Specifically, the number of the cooling unit 2 is three, and the three cooling units 2 are spaced apart from top to bottom in the height direction H within the battery housing 1. The three cooling units 2 divide the internal space of the battery housing 1 into four accommodating cavities 12 spaced apart from top to bottom in the height direction H.

Figure 9:
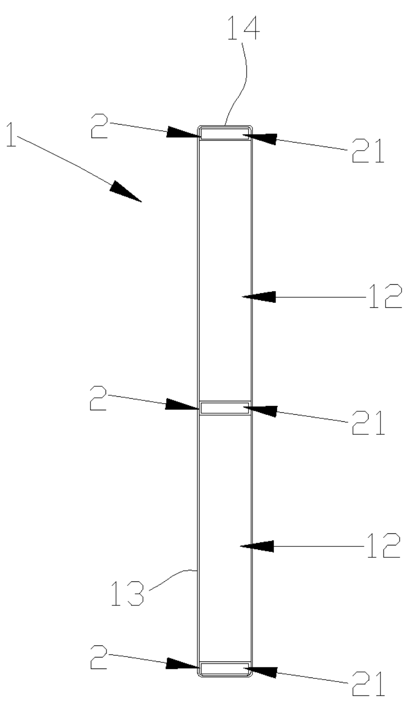
FIG. 9 is a schematic diagram of the structure of the battery housing in another embodiment of the present application.

As shown in FIG. 9, another embodiment of the present application provides a battery housing 1. Unlike the above embodiment, the arrangement of the cooling units 2 is different. Specifically, the number of the cooling unit 2 is three, and the three cooling units 2 are spaced apart from top to bottom in the height direction H within the battery housing 1, wherein the two cooling units 2 located at the top and bottom are respectively attached to the two second side plates 14, and the other cooling unit 2 is located in the middle of the battery housing 1. The three cooling units 2 divide the internal space of the battery housing 1 into two accommodating cavities 12 spaced apart from top to bottom in the height direction H.

Figure 10:
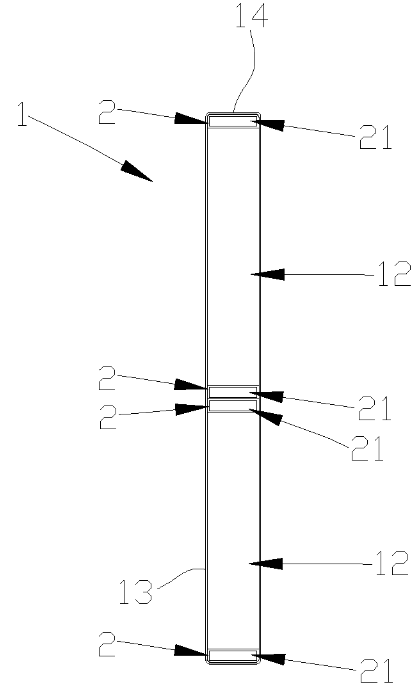
FIG. 10 is a schematic diagram of the structure of the battery housing in another embodiment of the present application.
Figure 11:
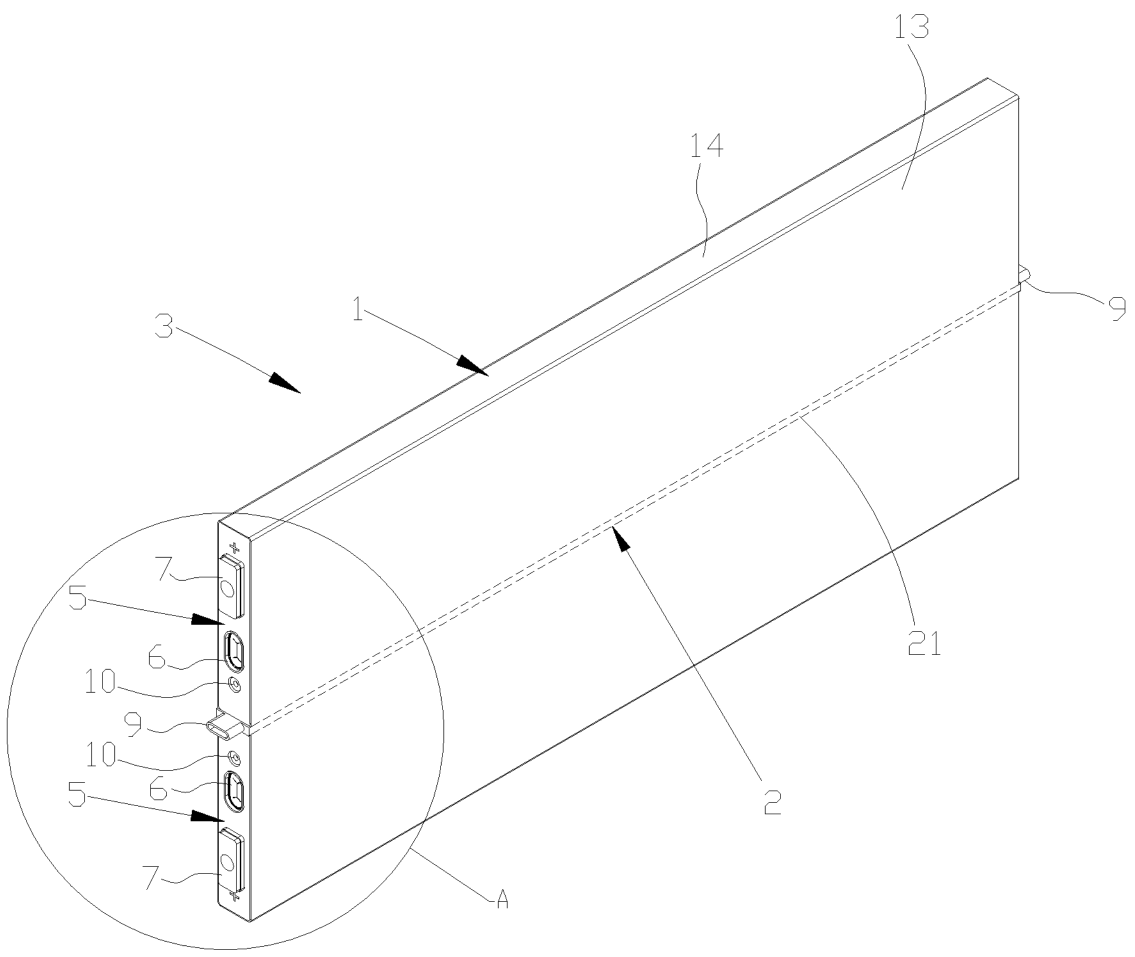
FIG. 11 is a schematic diagram of the three-dimensional structure of the lithium-ion secondary battery in an embodiment of the present application.
Figure 12:
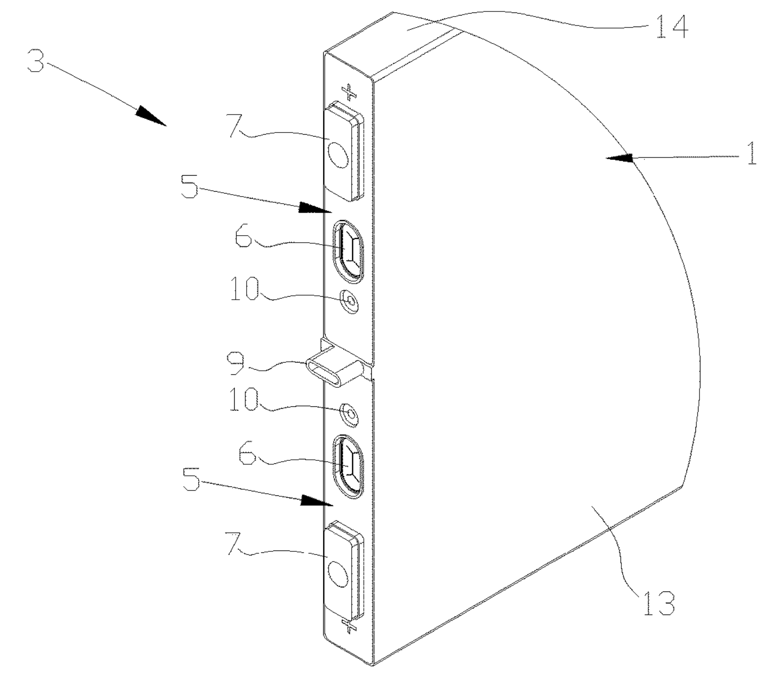
FIG. 12 is an enlarged schematic diagram of the position A in FIG. 11.
Figure 13:
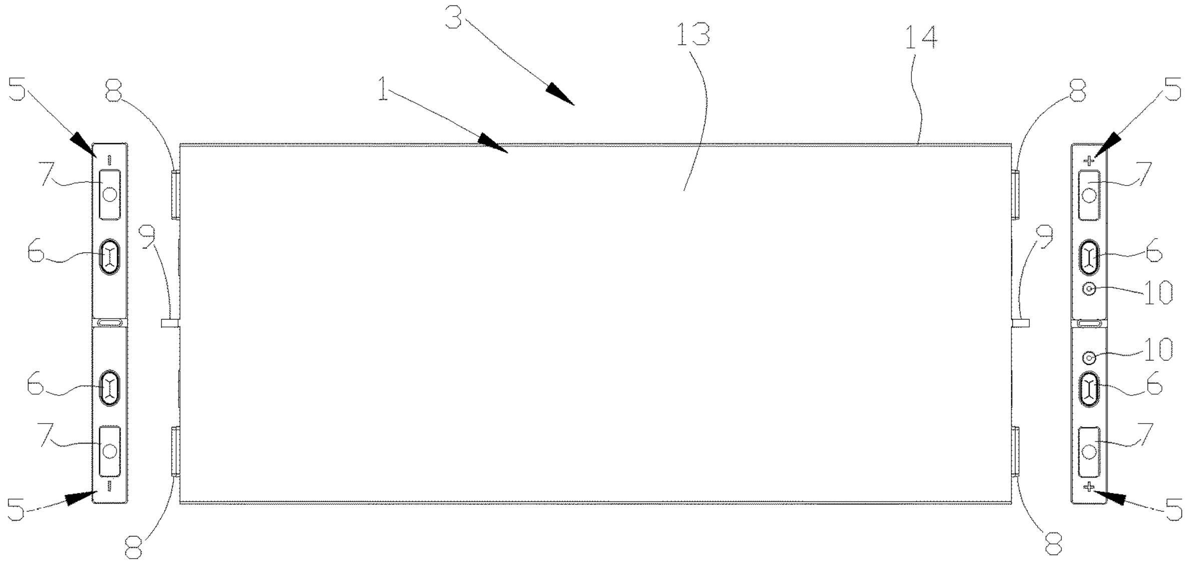
FIG. 13 is a partially exploded schematic diagram of FIG. 11.
Figure 14:
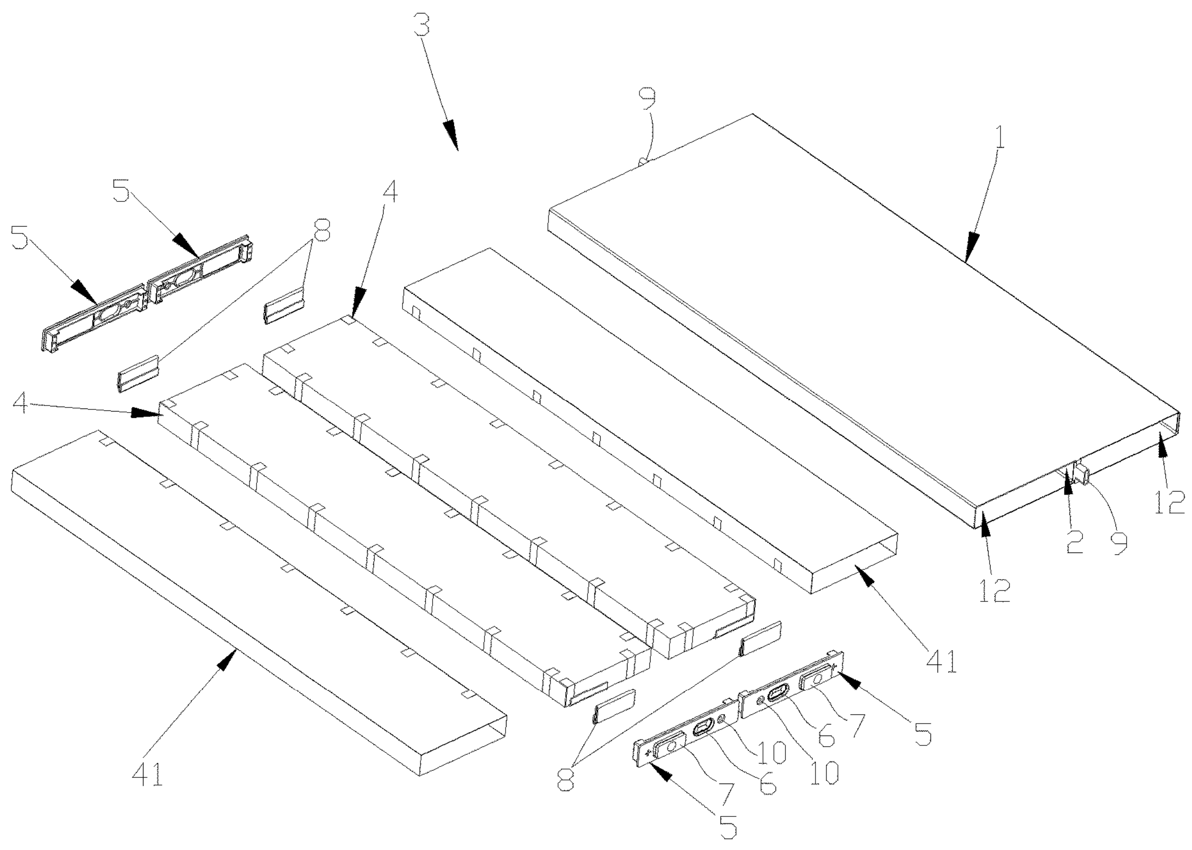
FIG. 14 is an exploded schematic diagram of FIG. 11.

As shown in FIG. 10, another embodiment of the present application provides a battery housing 1. Unlike the above embodiment, the number of the cooling unit 2 provided in the battery housing 1 is different. Specifically, the number of the cooling unit 2 is four, wherein the two cooling units 2 located at the top and bottom are respectively attached to the two second side plates 14, and the other two cooling units 2 are stacked to each other and are located in the middle of the battery housing 1. The four cooling units 2 divide the internal space of the battery housing 1 into two accommodating cavities 12 spaced apart from top to bottom in the height direction H.

Of course, in other embodiments, the number of the cooling unit 2 can also be more, such as five, six, etc., and the present application will not provide examples one by one. Multiple cooling units 2 divide the internal space of the battery housing 1 into multiple accommodating cavities 12, and at least one cooling unit 2 is provided between every two adjacent accommodating cavities 12. Of course, in order to save internal space and cost of the battery housing 1, the number of the cooling unit 2 provided between every two adjacent accommodating cavities 12 generally does not exceed two.

As shown in FIGS. 11 to 14, another embodiment of the present application provides a lithium-ion secondary battery 3. The lithium-ion secondary battery 3 includes battery cells 4, and the lithium-ion secondary battery 3 further includes the battery housing 1 as described above. The number of the battery cells 4 is the same as the number of the accommodating cavities 12 in the battery housing 1, both of which are two. Each accommodating cavity 12 contains a battery cell 4, and the cooling unit 2 is in thermal conduction contact with the battery cells 4 in adjacent accommodating cavities 12.

In other embodiments, the number of the battery cells 4 can also be more, such as three, four, etc. The number of the battery cells 4 is the same as the number of the accommodating cavities 12, each accommodating cavity 12 is the same size as the battery cell 4, and each accommodating cavity 12 contains a battery cell 4. Of course, in other embodiments, the size of the accommodating cavity 12 can also be different from that of the battery cell 4. For example, if one of the accommodating cavities 12 is twice the size of the battery cell 4, two battery cells 4 can be placed in the accommodating cavity 12, while the size of the other accommodating cavities 12 is the same as that of the battery cell 4.

Generally, the more battery cells 4 are placed in the battery housing 1 of same volume size, the higher the energy density of the battery. The fewer cooling units 2 are installed in the battery housing 1, the smaller the internal space occupied by the cooling units 2 in the battery housing 1, the more battery cells 4 can be placed in the battery housing 1, and the higher the energy density of the battery, but the worse the cooling effect inside the battery, and vice versa. The number of the cooling unit 2 installed in the battery housing 1 can be designed according to actual needs.

In the above embodiment, two opposite ends of each accommodating cavity 12 in the length direction L are each sealed with a battery cover plate 5, and the battery cover plate 5 is arranged at the opening 11 of the battery housing 1.

In the above embodiment, the two battery cover plates 5 provided at two opposite ends of each accommodating cavity 12 in the length direction L are each provided with an explosion-proof valve 6. Of course, in other embodiments, it can also be that only one of the battery cover plates 5 is provided with an explosion-proof valve 6.

In the above embodiment, the two battery cover plates 5 provided at two opposite ends of each accommodating cavity 12 in the length direction L are each provided with an electrode terminal 7. Each accommodating cavity 12 is provided with a tab 8 at opposite ends. The electrode terminal 7 is electrically connected to the battery cell 4 through the tab 8, one end of the tab 8 is connected to the battery cell 4, and the other end of the tab 8 is connected to the electrode terminal 7.

Specifically, the battery cell 4 has a positive electrode and a negative electrode. In the above embodiment, the positive and negative electrodes of the battery cell 4 are located at opposite ends of the battery cell 4, respectively. The electrode terminal 7 on the battery cover plate 5 at one end of each accommodating cavity 12 is electrically connected to the positive electrode of the battery cell 4, and the electrode terminal 7 on the battery cover plate 5 at the other end of each accommodating cavity 12 is electrically connected to the negative electrode of the battery cell 4.

Of course, in other embodiments, depending on the different battery cell systems, the two battery cells 4 can be designed to be connected in parallel or in series according to actual needs, and it is not limited herein.

In the above embodiment, an electrolyte injection hole 10 is provided in the battery cover plate 5 provided at one end of each accommodating cavity 12 in the length direction L. Of course, in other embodiments, it is also possible that the two battery cover plates 5 provided at two opposite ends of each accommodating cavity 12 in the length direction L are each provided with the electrolyte injection hole 10.

In the above embodiment, there are connectors 9 provided at two opposite ends of each cooling unit 2. The connectors 9 extend outward from the two ends of the cooling unit 2, and are located between two adjacent battery cover plates 5. The coolant flows into or out of the coolant channel 21 through the connectors 9. The connector 9 at one end of each cooling unit 2 serves as the coolant inlet, and the connector 9 at the other end serves as the coolant outlet. The coolant storage tank or coolant circulation system (not shown) located outside the battery module is connected to both the coolant inlet and the coolant outlet, thereby achieving the purpose of circulating the coolant in the coolant channel 21.

In the above embodiment, the outer surface of each battery cell 4 is wrapped with a Mylar film 41. Generally, the battery housing 1 is made of metal materials such as steel or aluminum, and the Mylar film 41 serves as insulation to prevent direct contact between the battery cell 4 and the battery housing 1, resulting in short circuiting issues.

In the above embodiment, the assembly method of the lithium-ion secondary battery 3 is as follows: firstly, the connectors 9 are welded at the two opposite ends of the cooling unit 2, then the two battery cells 4 are installed into the two accommodating cavities 12 of the battery housing 1, respectively, and thereafter the battery cover plates 5 are welded at the openings 11 of the battery housing 1, so that the battery cells 4 are packaged in the battery housing 1.

In the embodiments of the present application, the cooling unit 2 is provided in the battery housing 1, and the coolant channel 21 is provided in the cooling unit 2, thus allowing the coolant to circulate along the coolant channel 21. Meanwhile, the cooling unit 2 is in direct thermal conduction contact with the battery cells 4 in adjacent accommodating cavities 12. Through the heat exchange between the battery cells 4 and the cooling unit 2, as well as the heat exchange between the cooling unit 2 and the coolant, the heat of the battery cells 4 can be transferred to the coolant, and the heat is exported to the outside of the battery through the coolant, thereby achieving the purpose of cooling the battery. This structure has high heat conduction efficiency and good cooling effect. Also, the cooling unit 2 is located between two adjacent battery cells 4, thus enabling the timely export of heat between the two adjacent battery cells 4 without the problem of heat accumulation between the two adjacent battery cells 4, thereby effectively solving the internal heat dissipation problem of the battery and improving the safety performance of the battery.

Figure 15:
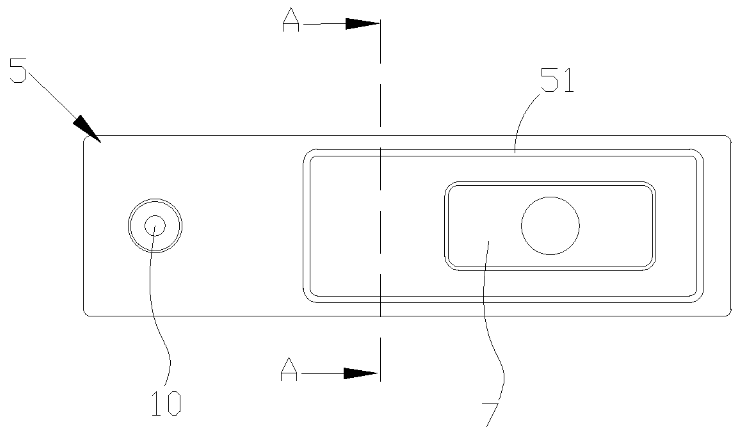
FIG. 15 is a schematic diagram of the structure of the battery cover plate in another embodiment of the present application.
Figure 16:
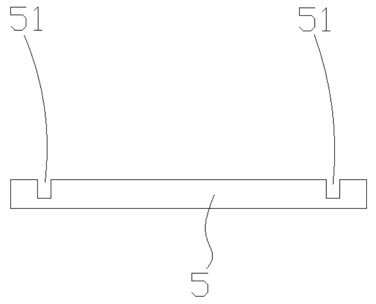
FIG. 16 is a cross-sectional schematic diagram of FIG. 15 along the A-A position.
Figure 17:
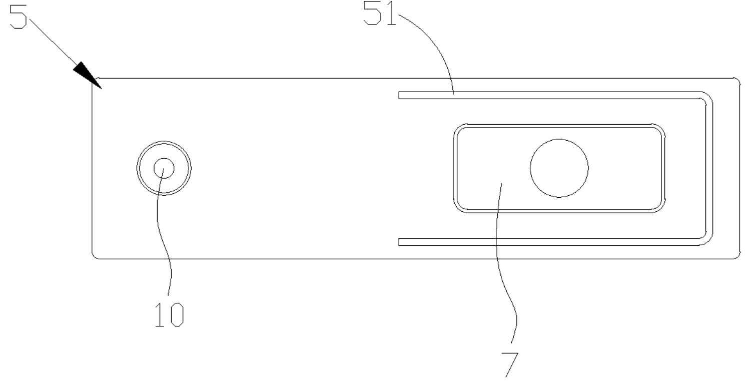
FIG. 17 is a schematic diagram of the structure of the battery cover plate in another embodiment of the present application.

As shown in FIGS. 15 and 16, another embodiment of the present application provides a lithium-ion secondary battery 3. Unlike the above embodiment, the structure of the battery cover plate 5 is different, and there is no explosion-proof valve 6 provided on the battery cover plate 5. Specifically, in this embodiment, the two battery cover plates 5 provided at two opposite ends of each accommodating cavity 12 in the length direction L are each provided with an electrode terminal 7, at least one of the battery cover plates 5 is provided with an explosion-proof groove 51, and the explosion-proof groove 51 surrounds the electrode terminal 7. Of course, as shown in FIG. 17, in other embodiments, the explosion-proof groove 51 may also be set partially around the electrode terminal 7.

In the above embodiment, the explosion-proof groove 51 is a rectangular structure, that is, a closed annular structure. Specifically, the closed annular structure can also be circular, triangular, and other shapes. Of course, in other embodiments, the explosion-proof groove 51 can also be a U-shaped, C-shaped, or L-shaped structure with an opening, and it is not limited herein.

In the above embodiment, the explosion-proof groove 51 is set on the outer surface of the battery cover plate 5. Of course, in other embodiments, the explosion-proof groove 51 can also be set on the inner surface of the battery cover plate 5, and it is not limited herein.

When the battery cells 4 inside the battery abnormally generate a large amount of heat, the chemical reaction inside the battery intensifies, thus producing a large amount of gas. The internal pressure of the battery increases sharply, posing a risk of thermal runaway of the battery and even leading to battery explosion. In the embodiments of the present application, an explosion-proof groove 51 is set on the battery cover plate 5, so that the battery cover plate 5 can burst or explode along the explosion-proof groove 51 in the event of abnormal battery conditions, and the battery can quickly release pressure, thus achieving the explosion-proof function of the battery. Also, the explosion-proof groove 51 surrounds or is set partially around the electrode terminal 7, so that the battery cover plate 5 can drive the electrode terminal 7 to move together when the battery cover plate 5 bursts or explodes. The electrode terminal 7 will leave from its original position and move away from the battery cells 4. The movement of the electrode terminal 7 will pull the tab 8, so that the tab 8 or the junction of the tab 8 (including the junction between the tab 8 and the electrode terminal 7, or the junction between the tab 8 and an electrode plate of the battery cell 4) is partially broken or completely broken, thereby weakening (the resistance will increase after the tab 8 is partially broken) or cutting off the electrical connection between the electrode terminal 7 and the battery cells 4, that is, weakening or cutting off the electrical connection between external electrical components and the battery cells 4, thereby effectively inhibiting the continuous heat generation inside the battery and improving the safety performance of the battery.

The above are only the specific embodiments of the present application, but the scope of protection of the present application is not limited to this. Any technical personnel familiar with this technical field who can easily think of changes or replacements within the scope of technology disclosed in the present application should be covered within the scope of protection of the present application. Therefore, the protection scope of the present application should be based on the protection scope of the claims.

INDUSTRIAL APPLICABILITY

For the battery housing provided in the present application, a cooling unit is provided in the battery housing, and a coolant channel is provided in the cooling unit, allowing the coolant to circulate along the coolant channel. Meanwhile, the cooling unit is in thermal conduction contact with the battery cells in adjacent accommodating cavities. Through the heat exchange between the battery cells and the cooling unit, as well as the heat exchange between the cooling unit and the coolant, the heat of the battery cells can be transferred to the coolant, and the heat is exported to the outside of the battery through the coolant, thereby achieving the purpose of cooling the battery. This structure has high heat conduction efficiency and good cooling effect. Also, at least one cooling unit is located between two adjacent battery cells, thus enabling the timely export of heat between the two adjacent battery cells without the problem of heat accumulation between the two adjacent battery cells, thereby effectively solving the internal heat dissipation problem of the battery and improving the safety performance of the battery.

What is claimed is:

1. A battery housing, wherein the battery housing has openings at both ends in the length direction, at least one cooling unit extending along the length direction is provided in the battery housing, a coolant channel for circulation of a coolant is provided in the cooling unit, the at least one cooling unit divides the internal space of the battery housing into at least two accommodating cavities spaced apart from top to bottom in the height direction, each accommodating cavity is configured for accommodating a battery cell;

the battery housing has a prismatic structure and comprises two opposite first side plates and two opposite second side plates, the two first side plates and the two second side plates are connected to each other, and the internal space of the battery housing is formed by the enclosure of the two first side plates and the two second side plates;

each cooling unit comprises two opposite first partition plates, the two first partition plates are spaced apart from top to bottom and extend in the length direction, and each cooling unit further comprises two opposite second partition plates, the two second partition plates are spaced apart from left to right and extend in the length direction, the outer wall of one of the second partition plates is attached to the inner wall of one of the first side plates, and the outer wall of the other second partition plate is attached to the inner wall of the other first side plate, the two first partition plates and the two second partition plates are connected to each other, the coolant channel is formed by the enclosure of the two first partition plates and the two second partition plates.

2. The battery housing as claimed in claim 1, wherein the cooling unit is a cooling plate or a cooling tube.

3. The battery housing as claimed in claim 1, wherein the number of the cooling unit is one, and the cooling unit is located in the middle of the battery housing, the cooling unit divides the internal space of the battery housing into two accommodating cavities spaced apart from top to bottom in the height direction.

4. The battery housing as claimed in claim 1, wherein the number of the cooling unit is two, and the two cooling units are stacked to each other and are located in the middle of the battery housing, the two cooling units divide the internal space of the battery housing into two accommodating cavities spaced apart from top to bottom in the height direction.

5. The battery housing as claimed in claim 1, wherein the number of the cooling unit is at least two, and the at least two cooling units are spaced apart from top to bottom in the height direction within the battery housing, the at least two cooling units divide the internal space of the battery housing into at least three accommodating cavities spaced apart from top to bottom in the height direction.

6. The battery housing as claimed in claim 1, wherein the number of the cooling unit is at least three, and the at least three cooling units are spaced apart from top to bottom in the height direction within the battery housing, wherein the two cooling units located at the top and bottom are respectively attached to the two second side plates.

7. The battery housing as claimed in claim 1, wherein the number of the cooling unit is four, wherein the two cooling units located at the top and bottom are respectively attached to the two second side plates, and the other two cooling units are stacked to each other and are located in the middle of the battery housing.

8. The battery housing as claimed in claim 1, wherein there are connectors provided at two opposite ends of each cooling unit, the connectors extend outward from the two ends of the cooling unit, the coolant flows into or out of the coolant channel through the connectors.

9. The battery housing as claimed in claim 1, wherein the two first side plates are arranged in the height direction, the two second side plates are arranged in the thickness direction of the battery housing, and the two first partition plates are arranged parallel to the two second side plates.

10. A lithium-ion secondary battery, comprising a battery housing, wherein the battery housing has openings at both ends in the length direction, at least one cooling unit extending along the length direction is provided in the battery housing, a coolant channel for circulation of a coolant is provided in the cooling unit, the at least one cooling unit divides the internal space of the battery housing into at least two accommodating cavities spaced apart from top to bottom in the height direction, each accommodating cavity is configured for accommodating a battery cell, each accommodating cavity of the battery housing contains a battery cell, and the cooling unit is in thermal conduction contact with the battery cells in adjacent accommodating cavities;

two opposite ends of each accommodating cavity in the length direction are each sealed with a battery cover plate, and the battery cover plate is arranged at the opening of the battery housing; and the two battery cover plates provided at two opposite ends of each accommodating cavity in the length direction are each provided with an explosion-proof valve, or only one of the battery cover plates is provided with an explosion-proof valve; or the two battery cover plates provided at two opposite ends of each accommodating cavity in the length direction are each provided with an electrode terminal, at least one of the battery cover plates is provided with an explosion-proof groove, and the explosion-proof groove surrounds or is set partially around the electrode terminal.

11. An electric vehicle, comprising the lithium-ion secondary battery as claimed in claim 10.

12. The lithium-ion secondary battery as claimed in claim 10, wherein the battery housing has a prismatic structure and comprises two opposite first side plates and two opposite second side plates, the two first side plates and the two second side plates are connected to each other, and the internal space of the battery housing is formed by the enclosure of the two first side plates and the two second side plates.

13. The lithium-ion secondary battery as claimed in claim 12, wherein each cooling unit comprises two opposite first partition plates, the two first partition plates are spaced apart from top to bottom and extend in the length direction, two opposite sides of each first partition plate are respectively connected to the inner walls of the two first side plates, the coolant channel is formed by the enclosure of the two first partition plates and the two first side plates.

14. The lithium-ion secondary battery as claimed in claim 13, wherein the two opposite sides of each first partition plate are connected to the inner walls of the two first side plates as an integrated structure.

15. The lithium-ion secondary battery as claimed in claim 12, wherein each cooling unit comprises two opposite first partition plates, the two first partition plates are spaced apart from top to bottom and extend in the length direction, and each cooling unit further comprises two opposite second partition plates, the two second partition plates are spaced apart from left to right and extend in the length direction, the outer wall of one of the second partition plates is attached to the inner wall of one of the first side plates, and the outer wall of the other second partition plate is attached to the inner wall of the other first side plate, the two first partition plates and the two second partition plates are connected to each other, the coolant channel is formed by the enclosure of the two first partition plates and the two second partition plates.

* * * * *